United States Patent
Khuri-Yakub et al.

(10) Patent No.: US 7,321,181 B2
(45) Date of Patent: Jan. 22, 2008

(54) CAPACITIVE MEMBRANE ULTRASONIC TRANSDUCERS WITH REDUCED BULK WAVE GENERATION AND METHOD

(75) Inventors: Butrus T. Khuri-Yakub, Palo Alto, CA (US); Arif S. Ergun, Mountain View, CA (US); Goksen Yaralioglu, Mountain View, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 360 days.

(21) Appl. No.: 11/098,863

(22) Filed: Apr. 4, 2005

(65) Prior Publication Data

US 2005/0236937 A1    Oct. 27, 2005

Related U.S. Application Data

(60) Provisional application No. 60/560,789, filed on Apr. 7, 2004.

(51) Int. Cl.
*H01L 41/08* (2006.01)

(52) U.S. Cl. .................. 310/320; 310/324; 310/334
(58) Field of Classification Search ................ 310/309, 310/311, 327, 334
See application file for complete search history.

(56) References Cited

U.S. PATENT DOCUMENTS

| | | | |
|---|---|---|---|
| 5,619,476 | A | 4/1997 | Haller et al. |
| 5,870,351 | A | 2/1999 | Ladabaum et al. |
| 5,894,452 | A | 4/1999 | Ladabaum et al. |
| 6,831,394 | B2 * | 12/2004 | Baumgartner et al. ...... 310/334 |
| 6,836,020 | B2 | 12/2004 | Cheng et al. |
| 6,862,254 | B2 | 3/2005 | Ladabaum et al. |
| 7,125,383 | B2 * | 10/2006 | Hoctor et al. ............... 600/438 |

\* cited by examiner

*Primary Examiner*—Mark Budd
(74) *Attorney, Agent, or Firm*—Perkins Coie LLP

(57) ABSTRACT

A capacitive membrane ultrasonic transducer which includes a membrane supported by a substrate in which ultrasonic bulk waves at the frequency of operation of the transducers are suppressed by configuring the substrate and a method of suppressing the ultrasonic bulk waves.

9 Claims, 3 Drawing Sheets

CAPACITIVE MEMBRANE ULTRASONIC TRANSDUCERS WITH REDUCED BULK WAVE GENERATION AND METHOD

CROSS-REFERENCES TO RELATED APPLICATIONS

This application claims priority to U.S. Provisional Patent Application No. 60/560,789 filed Apr. 7, 2004.

BRIEF DESCRIPTION OF THE INVENTION

This invention relates generally to a capacitive membrane ultrasonic transducers (cMUTs), and describes novel cMUTs having reduced bulk wave generation at the frequency of operation of the cMUT and to a method of operation. The proposed modifications to the substrate can be applied to the mountings (backing) of piezoelectric transducers with the same effect of reducing reflections from the backing.

BACKGROUND OF THE INVENTION

Capacitive membrane ultrasonic transducers have a metal coated membrane such as silicon or silicon nitride supported above a substrate by an insulating layer such as silicon oxide, silicon nitride or other insulating material. The substrate may be a highly doped semiconductor material such as silicon or may be undoped silicon with a metal layer. The thin metal covering the membrane and the highly doped substrate or metal layer form the two electrodes of a capacitor. Generally the substrate, support and membrane form a cell which may be evacuated. Generally the transducers comprise a plurality of cells of the same or different sizes and shapes. In operation, the cells may be arranged in arrays with the electrical excitation generating beam patterns. Typically transducer cells have sizes ranging between 5 µm and 1000 µm in diameter.

The fabrication and operation of capacitive membrane transducers is described in many publications and patents. For example U.S. Pat. Nos. 5,619,476, 5,870,351 and 5,894,452, incorporated herein by reference, describe fabrication using surface machining technologies. Pending Application Ser. No. 60/683,057 filed Aug. 7, 2003, incorporated herein by reference, describes fabrication by using wafer bonding techniques. Such transducers are herein referred to a capacitive membrane ultrasonic transducers (cMUTS).

FIG. 1 shows a typical cMUT cell. The active part of a cMUT is the membrane 11 with metal electrode 12 supported above a fixed substrate 13. A DC bias voltage 14 is applied between the membrane and the bottom electrodes to create electrostatic attraction, pulling the membrane toward the substrate. An AC voltage 16 is applied to the biased membrane to generate harmonic membrane motion and ultrasonic waves.

In operation, it has always been assumed that the substrate is fixed (not movable) and an applied alternating electric field forces the membrane into motion, thus generating ultrasonic waves in the medium, whether air, water, or a similar medium. However, this assumption does not hold in the entire frequency range. Both experiments and simulations show that there is always some energy coupled into the substrate generating longitudinal waves which reflect from the bottom of the substrate, and are picked up by the capacitor. The waves that are reflected from the bottom of the substrate are out of phase with the excitation signal except at frequencies (Eq. 1) where the thickness of the substrate is an integer multiple of half of the wavelength. That is, the energy coupled into the substrate is not a concern except at those frequencies where the substrate will behave like a resonant cavity and hinder proper device operation. These are the frequencies where the substrate thickness is a multiple of the half of the wavelength:

$$f_R = \frac{n \cdot v}{2t} \quad (1)$$

where n is an integer number, v is the longitudinal velocity of sound in the substrate, and t is the thickness of the substrate. For example, if we assume that the substrate is silicon and the longitudinal wave velocity is 8000 m/s, and the thickness of the substrate is 500 µm, then these substrate ringing modes will occur at integer multiples of 8 MHz. If the operating frequency range of the cMUT transducer is below the first ringing mode (8 MHz in the above example), or between the ringing modes, then there is no concern for bulk wave generation (FIG. 2, case 1 and 2). However, if the operating frequency range contains one or more of these modes, then these modes will appear as notches in the frequency response (FIG. 2, case 3), and cause ringing in the time-domain response of the cMUT transducer, which is certainly undesirable. One way to eliminate the substrate ringing modes is to bond the silicon substrate to a backing as suggested in U.S. Pat. No. 6,862,254. In this method, the backing has to be impedance matched to silicon and attenuating. However, the attenuation coefficient cannot be too high because it deteriorates the impedance matching. Therefore, to achieve adequate suppression for the substrate ringing modes one has to have a thick backing layer. This method has been shown to work properly. However, carrying a thick backing layer on the back of a normally thin cMUT transducer is not practical for many applications where space is limited. The bonding of the cMUT transducer to the backing is achieved using an epoxy layer as glue. Proper suppression of the substrate modes requires very thin epoxy layer at the bonding interface, and a hermetic bond. Although these requirements may be relatively easy to achieve at low frequencies, the requirements become tighter as the frequency increases.

OBJECT AND SUMMARY OF THE INVENTION

It is an object of this invention to provide an alternative method of reducing bulk wave generation at the frequency of operation of cMUTs.

The foregoing and other objects of the invention are achieved by configuring the cMUT substrate so that it suppresses generation of bulk waves at the frequency of operation of the cMUT.

BRIEF DESCRIPTION OF THE DRAWINGS

The foregoing and other objects of the invention will be more clearly understood from reading the following description of the invention in conjunction with the accompanying drawings in which.

DESCRIPTION OF THE PREFERRED EMBODIMENTS

In one embodiment the thickness of the substrate can be reduced either by choosing the starting material appropriately, or by reducing the thickness of the substrate during or after the fabrication of the cMUT by grinding and polishing the substrate. In this way, one can adjust the thickness of the substrate to push the ringing modes out of the operating frequency range.

Figure 1:
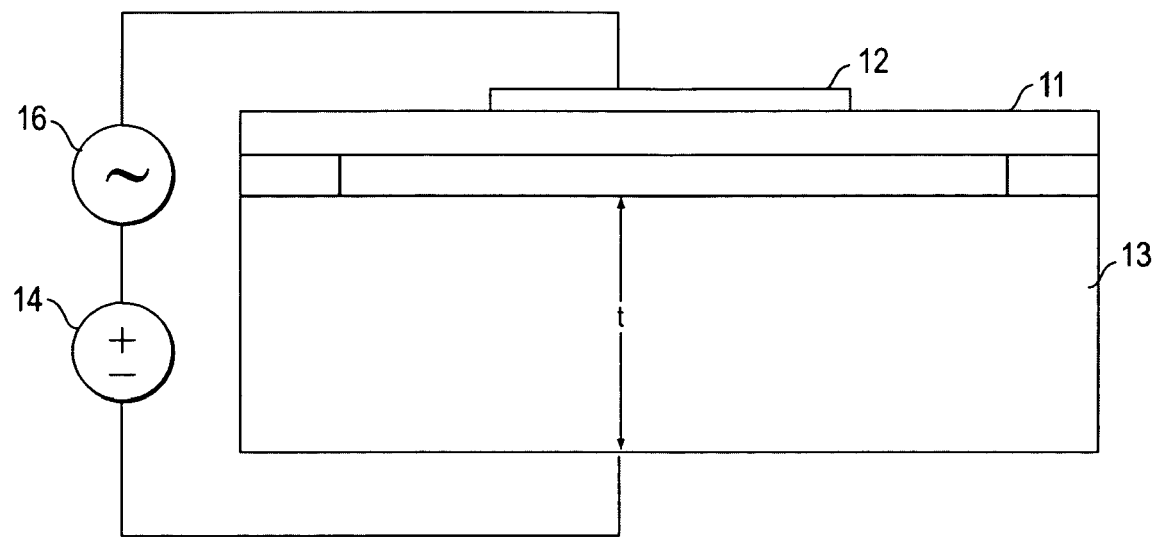
FIG. 1 shows a cMUT transducer and applied voltages.
Figure 2:
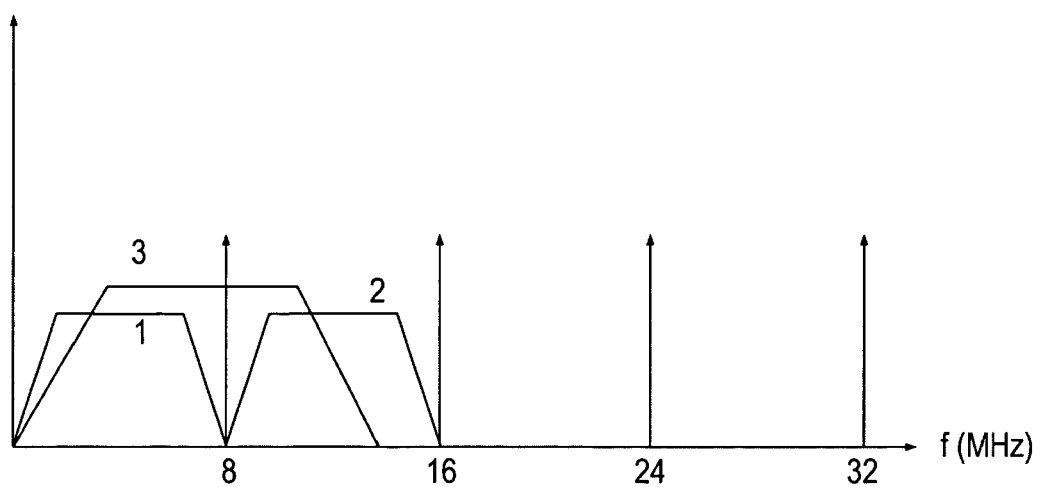
FIG. 2 is a diagram showing frequency of operation of a typical cMUT and bulk wave generation frequencies.
Figure 3:
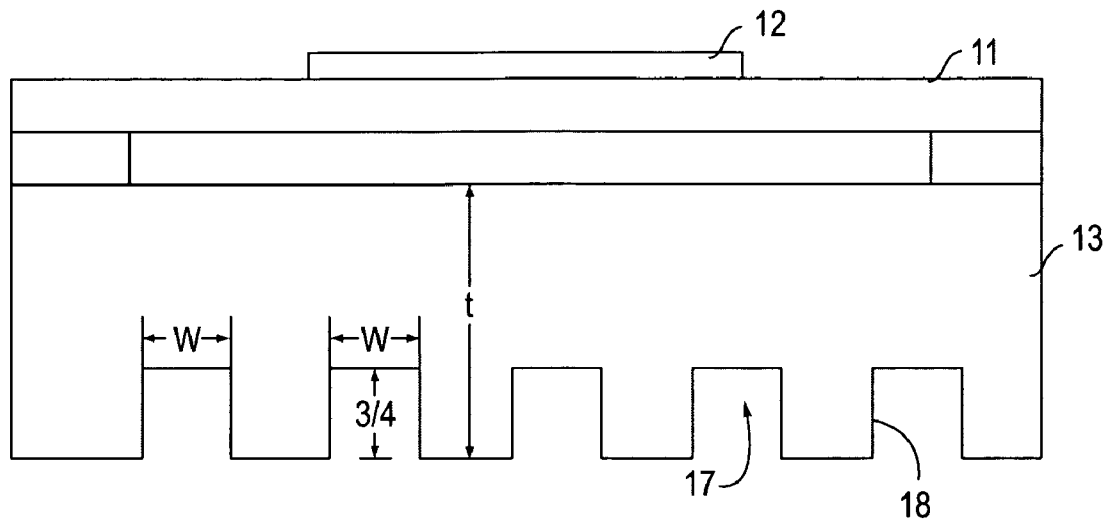
FIG. 3 is a sectional view showing an embodiment of the invention where the substrate is grooved to suppress the generation of bulk waves at the operating frequency.

In another embodiment, photolithographic patterning and etching of the substrate can be used to define a periodic pattern of grooves 17 on the back side of the substrate as shown in FIG. 3. In this method the depth 19 of the grooves is designed to suppress a specific substrate bulk wave frequency or ringing mode. The patterned grooves form a diffraction grating. Diffraction gratings reflect incoming waves in the normal direction as well as oblique directions to the normal. The first oblique direction for example is given by:

$$\theta = \arctan\left(\frac{\lambda}{T}\right) \quad (2)$$

where T is the periodicity of the grating and λ is given by:

$$\lambda = \frac{v}{f_R} \quad (3)$$

The amplitudes of the diffracted orders depend on the depth of the grooves. For maximum suppression of the substrate resonances the height should be equal to λ/4.

On the other hand, the periodicity of the grating should be less than 10λ. The width of the groove should be half of the periodicity for maximum suppression. When the depth of the grooves is quarter of a wavelength, then the waves reflected from the top and bottom of the grooves are out of phase and add incoherently. For example, to suppress the 8 MHz ringing mode one has to make the grooves 250 μm deep. To suppress the higher order ringing modes in this example, one need 125 μm (for 16 MHz), 83 μm (24 MHz), and 62.5 μm (32 MHz) deep grooves. Please, note that these values are only for this example, and the frequency of the ringing modes has to be calculated according to the substrate thickness.

Figure 4:
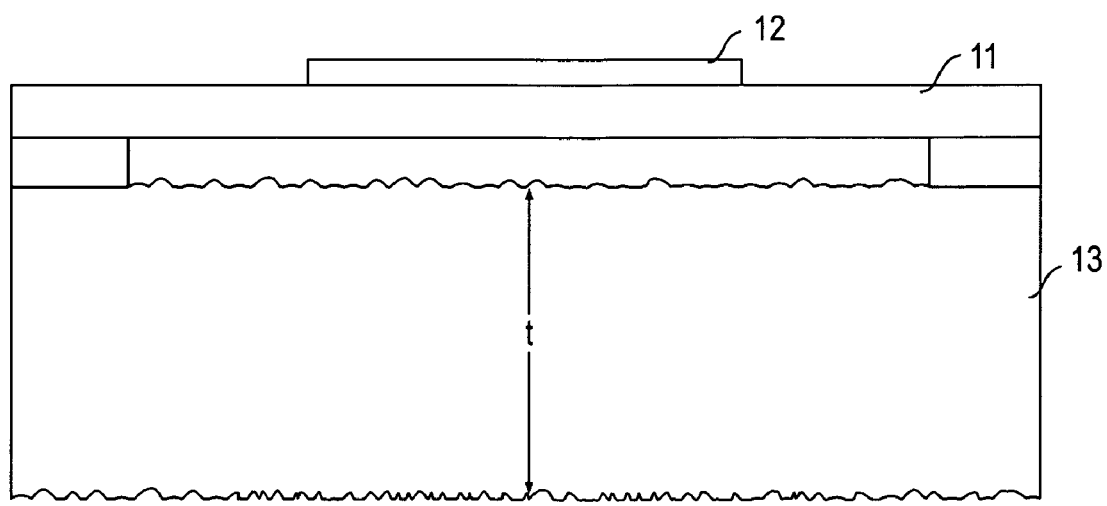
FIG. 4 is a sectional view of a cMUT in which the upper and lower surfaces of the cMUT are roughened to suppress the generation of bulk waves at the operating frequency.

It is clear that as the frequency of the substrate ringing mode that is targeted increases the required depth of the grooves decreases. If the frequency is sufficiently high, then one can suppress the target frequency by roughening the backside or the front side of the substrate, or both as shown in FIG. 4. The roughness will scatter the energy coupled into the substrate incoherently so that a resonant cavity will not form at the target frequency. The roughness can be controlled to target a specific frequency range.

Figure 5:
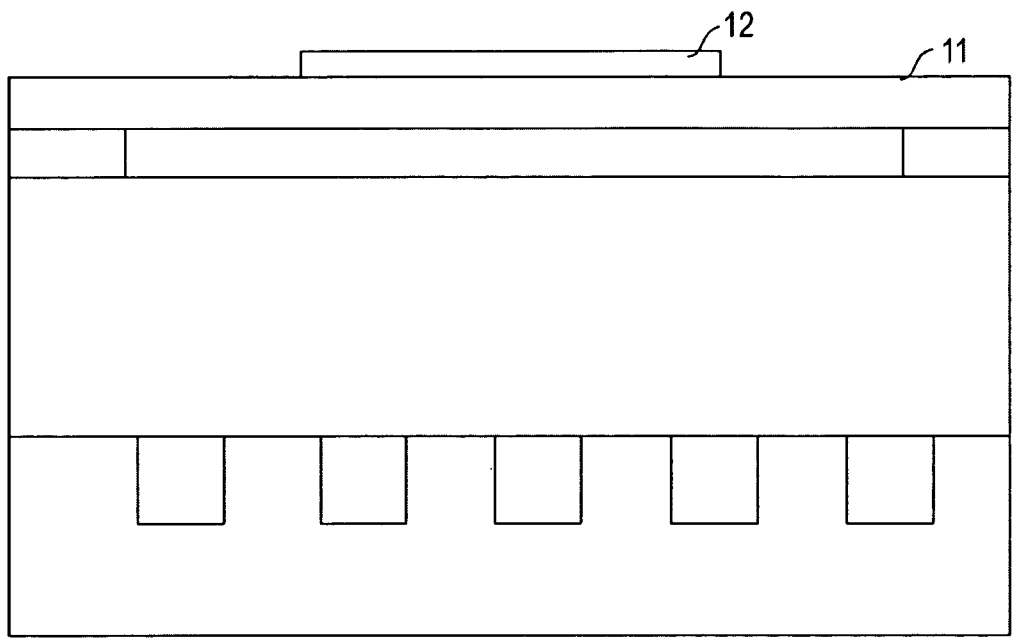
FIG. 5 shows a cMUT with a grooved backing for suppressing generation of bulk waves and the frequency of operation.

In another embodiment the cMUT transducer is bonded to a backing which is patterned like the backside of the cMUT substrate in the second embodiment, as shown in FIG. 5. However, in this case, the backing material is not impedance matched to the substrate. On the contrary, it is required that the mechanical impedance of the backing be much larger (>3×) than the mechanical impedance of the substrate. It is also required that the material that fills the grooves has mechanical impedance that is much lower (<3×) than the mechanical impedance of the substrate. This filling may be air, vacuum, or a material with very high attenuation coefficient which eliminates any reflections coming from the bottom of the groove. When these conditions are met the reflections coming from the substrate-backing interface are out of phase with the reflection coming from the substrate-filling interface, thus suppressing the substrate ringing modes. In this method, the thickness of the backing is not critical because the efficiency of the suppression of the substrate ringing modes does not depend on the thickness of the backing. Also, the depth of the grooves in the backing is not critical as long as the reflections coming from the bottom of the groove are sufficiently attenuated. For this reason using air and vacuum as the filling material is a better solution. Likewise, the grooves can be defined on the backside of the substrate instead of the backing. The cMUT transducer is bonded to a high impedance flat backing.

Figure 6:
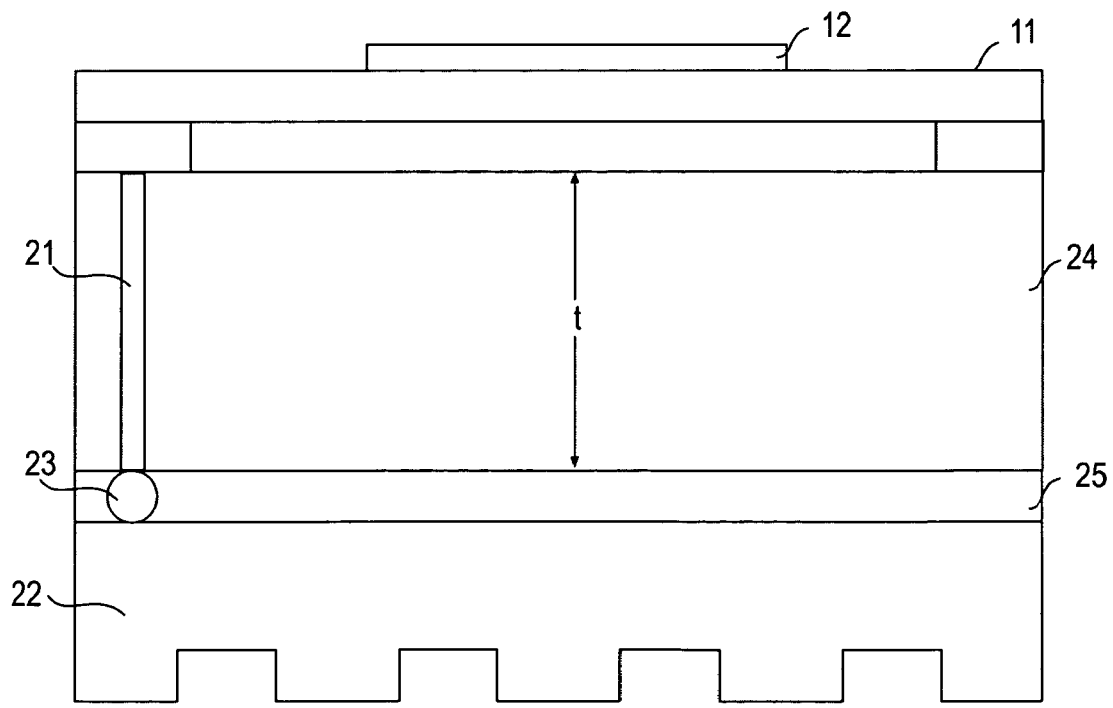
FIG. 6 shows a cMUT with integrated electronics with bulk wave suppression on the bottom surface of the electronics substrate.

Integration of electronics with the cMUT transducer is very desirable, since this eliminates the long cables between the transducer and the electronics. Integration may be achieved by bonding the transducer wafer to the electronics (IC) wafer using through wafer interconnects 21 to connect the cMUT to the electronic circuits in a electronics substrate 22 via bumps 23. See U.S. Pat. No. 6,836,020 incorporated herein and by reference for a detailed description of a through wafer interconnect. Epoxy can be used as a bonding layer 25 between the cMUT substrate 24 and the electronics substrate 22. The height of the epoxy layer between the wafers can be chosen to be half wavelength. This will make the bonding layer transparent to the bulk waves. Any of the above proposed structures for reducing bulk waves of the operating frequency can be applied to the bottom of the IC wafer one of which is shown in FIG. 6. It is apparent, however, that structures such as those described with reference to FIGS. 4 and 5 can also be used to suppress bulk waves at the frequency of operation.

What is claimed is:

1. The method of suppressing bulk wave generation at the frequency of operation of a cMUT of the type which includes a membrane supported above a substrate which comprises configuring the substrate to suppress bulk wave generation at the operating frequency wherein the substrate is configured by photolithographically patterning and etching a defined periodic pattern of grooves on a back side of the substrate with the groove depth being one quarter the wavelength of the bulk waves to be suppressed.

2. The method of suppressing bulk wave generations at the frequency of operation of a cMUT of the type which includes a membrane supported above a substrate which comprises configuring the substrate to suppress bulk wave generation at the operating frequency which comprises configuring the substrate front side, backside or both by roughening.

3. The method of suppressing bulk wave generation at the frequency of operation of a cMUT of the type which includes a membrane supported above a substrate which comprises configuring the substrate to suppress bulk wave generation at the operating frequency which includes adding a backing, having a mechanical impedance much larger than the mechanical impedance of the substrate with grooves in the backing or substrate filled with a material having mechanical impedance much lower than a mechanical impedance of the substrate.

4. The method of reducing bulk wave generation at the frequency of operation of a cMUT of the type which includes a membrane supported above a substrate which comprises configuring the substrate to suppress bulk wave generation at the operating frequency in which the filled material is selected from the group comprising air, vacuum or a material with a very high attenuation coefficient which eliminates any reflections coming from the bottom of the grooves.

5. The method of suppressing bulk wave generation at the frequency of operation of a cMUT which is integrated with an electronic substrate which comprises configuring the backside of the electronic substrates so that all bulk waves are outside the frequency of operation range of the cMUT, and wherein the electronic substrate is configured by photolithographically patterning and etching a defined periodic pattern of grooves on a side of the electronic substrate with the groove depth being one quarter the wavelength of the bulk waves to be suppressed and the periodicity being less than ten times the wavelength.

6. The method of reducing bulk wave generation at the frequency of operation of a cMUT which is integrated with an electronic substrate which comprises configuring the backside of the electronic substrates so that all bulk waves are outside the frequency of operation range of the cMUT, and which includes adding a backing having a higher mechanical impedance than that the electronic substrate with grooves in the backing or electronic substrate filled with a material having mechanical impedance much lower than a mechanical impedance of the electronic substrate.

7. A cMUT of the type which includes a membrane supported by a substrate in which the substrate is configured to suppress bulk wave generation at the frequency of operation of the cMUT wherein the substrate is configured by a periodic pattern of grooves on the backside of the substrate which have a depth of one quarter the wavelength of the operating frequency of the cMUT and peridocity of the grooves is less than ten times the wavelength.

8. A cMUT of the type which includes a membrane supported by a substrate in which the substrate is configured to suppress bulk wave generation at the frequency of operation of the cMUT in which the substrate is configured by roughening the front side, back side or both sides of the substrate.

9. A cMUT of the type which includes a membrane supported by a substrate in which the substrate is configured to suppress bulk wave generation at the frequency of operation of the cMUT in which the substrate includes a backing having a higher mechanical impedance than the substrate and grooves filled with a material having a lower mechanical impedance at the interface or the substrate and backing material.

* * * * *

UNITED STATES PATENT AND TRADEMARK OFFICE
CERTIFICATE OF CORRECTION

| | | |
|---|---|---|
| PATENT NO. | : 7,321,181 B2 | Page 1 of 1 |
| APPLICATION NO. | : 11/098863 | |
| DATED | : January 22, 2008 | |
| INVENTOR(S) | : Khuri-Yakub et al. | |

It is certified that error appears in the above-identified patent and that said Letters Patent is hereby corrected as shown below:

Col. 1, line 10 should read as follows:

-- FEDERALLY-SPONSORED RESEARCH OR DEVELOPMENT

This invention was made with Government support under contracts N00014-96-1-1099 and N00014-94-1-0730 awarded by the Department of the Navy ONR. The Government has certain rights in this invention. --

Signed and Sealed this
Ninth Day of August, 2011

David J. Kappos
*Director of the United States Patent and Trademark Office*